(12) United States Patent
Anhut et al.

(10) Patent No.: US 10,031,325 B2
(45) Date of Patent: Jul. 24, 2018

(54) METHOD AND ARRANGEMENT FOR LIGHT SHEET MICROSCOPY

(71) Applicant: Carl Zeiss Microscopy GmbH, Jena (DE)

(72) Inventors: Tiemo Anhut, Jena (DE); Thomas Kalkbrenner, Jena (DE); Daniel Schwedt, Weimar (DE); Jörg Siebenmorgen, Jena (DE); Helmut Lippert, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 15/120,162

(22) PCT Filed: Feb. 19, 2015

(86) PCT No.: PCT/EP2015/053449
§ 371 (c)(1),
(2) Date: Aug. 19, 2016

(87) PCT Pub. No.: WO2015/124648
PCT Pub. Date: Aug. 27, 2015

(65) Prior Publication Data
US 2017/0068080 A1 Mar. 9, 2017

(30) Foreign Application Priority Data

Feb. 20, 2014 (DE) .................. 10 2014 102 215

(51) Int. Cl.
*G02B 21/00* (2006.01)
*G02B 27/00* (2006.01)
(Continued)

(52) U.S. Cl.
CPC ......... *G02B 21/008* (2013.01); *G02B 21/006* (2013.01); *G02B 21/0032* (2013.01);
(Continued)

(58) Field of Classification Search
CPC .............. G02B 21/008; G02B 21/0032; G02B 21/0036; G02B 21/006; G02B 21/0076;
(Continued)

(56) References Cited

U.S. PATENT DOCUMENTS

2005/0041308 A1 2/2005 Gaida et al.
2013/0176622 A1 7/2013 Abrahamsson et al.

FOREIGN PATENT DOCUMENTS

DE 10 2005 02707 5/2006
DE 10 2008 049 886 4/2010
(Continued)

OTHER PUBLICATIONS

Notification of Transmittal of Translation of the International Preliminary Report on Patentability dated Aug. 23, 2016 for application No. PCT/EP2015/053449 filed on Feb. 19, 2015.
(Continued)

*Primary Examiner* — Bumsuk Won
*Assistant Examiner* — Grant Gagnon
(74) *Attorney, Agent, or Firm* — Haug Partners LLP (57) ABSTRACT

An arrangement for light sheet microscopy that includes a means for scanning a sample volume with a light sheet, which includes an angle $\delta \neq 90°$ with the optical axis of an objective. The light sheet passes through the entire sample volume in the propagation direction, and the depth of field $S_{obj}$ of the objective is less than the optical-axis depth T of this sample volume. An optical device, disposed downstream of the objective, increases the depth of field $S_{obj}$ to a depth of field $S_{eff} \geq$ the depth T of this sample volume. The arrangement also includes a means for positioning the sample volume within the region of the depth of field $S_{eff}$. A spatially resolving optoelectronic area sensor is disposed downstream of the optical device, and hardware and soft-
(Continued)

ware are provided to generate sample-volume images from the electronic image signals output by the area sensor.

12 Claims, 5 Drawing Sheets

(51) Int. Cl.
    *H04N 5/372*    (2011.01)
    *H04N 3/02*    (2006.01)
    *G02B 21/16*    (2006.01)
    *G02B 21/36*    (2006.01)

(52) U.S. Cl.
    CPC ..... *G02B 21/0036* (2013.01); *G02B 21/0076* (2013.01); *G02B 21/16* (2013.01); *G02B 21/365* (2013.01); *G02B 27/0075* (2013.01); *H04N 3/02* (2013.01); *H04N 5/372* (2013.01)

(58) Field of Classification Search
    CPC ... G02B 21/16; G02B 21/365; G02B 27/0075
    USPC .......................................................... 359/385
    See application file for complete search history.

(56) References Cited

FOREIGN PATENT DOCUMENTS

| DE | 10 2011 000 835 | 8/2012 |
|----|-----------------|--------|
| DE | 10 2011 051 042 | 12/2012 |
| EP | 2 535 754 | 12/2012 |
| JP | 2005/003909 | 1/2005 |
| WO | WO 2007/044725 | 4/2007 |

OTHER PUBLICATIONS

International Search Report for Application No. PCT/EP2015/053449 dated May 21, 2015.
German Search Report for Application No. 10 2014 102 215.7 dated Mar. 14, 2014.

METHOD AND ARRANGEMENT FOR LIGHT SHEET MICROSCOPY

The present application claims priority from International Patent Application No. PCT/EP2015/053449 filed on Feb. 19, 2015, which claims priority from German Patent Application No. 10 2014 102 215.7 filed on Feb. 20, 2014, the disclosures of which are incorporated herein by reference in their entirety.

FIELD OF THE INVENTION

It is noted that citation or identification of any document in this application is not an admission that such document is available as prior art to the present invention.

The invention relates to a method for light sheet microscopy and arrangements for carrying out this method.

Light sheet microscopy, which is also referred to as light sheet fluorescence microscopy (LSFM) or single plane illumination microscopy (SPIM), is already known per se as a relatively recent development of fluorescence-microscopic methods and arrangements.

Compared to conventional fluorescence microscopy with the property of optical sectioning, like in confocal laser scanning microscopy or two-photon microscopy, the illumination of a thin layer in the sample, corresponding to the thickness of a light sheet, enables the measurement and display of an optical section during light sheet microscopy, while at the same time suppressing the image background. Here, the negative effects as a result of bleaching or light-induced stress in biological samples are reduced during the examination of same. Since the detection can be undertaken in the wide field, it is moreover possible also to quickly detect relatively large sample regions.

The present invention relates to the subject area of light sheet microscopy, in which the light sheet defines an excitation plane which includes an angle $\delta \neq 90°$ with the optical axis of the detection objective, wherein the sample is scanned by this light sheet.

In this respect, DE 10 2005 027 077 A1 describes a microscope comprising an illumination device, in which a light strip is generated, said light strip illuminating the sample in a plane which is inclined in relation to the detection direction by an angle which differs from 90°. The detection direction is defined by an objective, through which the detection light reaches a surface detector.

The illuminated plane is rotatable about an axis of rotation. In different designs, either the surface detector is movable in synchronous fashion with the rotation of the illumination plane or the spatial situation of the intermediate image plane or the image plane is influenced in such a way that it is kept constant independently of the orientation of the illuminated plane.

If, in the first case, the illuminated plane is rotated about e.g. an axis parallel to the optical axis, the surface detector must likewise be rotated about an axis parallel to the optical axis thereof. If the angle between the illuminated plane and the detection direction is modified, the angle between the detector surface and the propagation direction of the incident detection light must be updated in accordance with this change of angle.

In the second case, the spatial situation of the intermediate image plane or of the image plane is influenced by e.g. synchronizing the rotation of prisms with the rotation of the illumination plane in order always to image the illuminated sample region on the detector surface.

A disadvantage in this case is that it is not possible to meet the Scheimpflug condition, according to which the image plane, objective plane and sharpness plane must intersect along a common straight line during optical imaging, in particular for standard imaging conditions, since the angle between the detector surface and the optical axis becomes very large.

DE 10 2011 000 835 A1 describes a scanning microscope with a reflected-light configuration. Here, an objective generates an elongate illumination focus in an object to be imaged and a scanning device moves the illumination focus over a target region to be illuminated in the object by changing the direction of incidence, with which the illumination light is incident into the entrance pupil of the objective. The location of the incidence of the illumination light into the entrance pupil is decentrally offset in relation to the pupil center. As a result, the illumination focus generates a light sheet which, due to the decentral entrance of the illumination light into the entrance pupil of the objective, is oblique in relation to the optical axis.

The fluorescence radiation originating from the target region illuminated by the light sheet is detected by the objective and guided into a detection optical unit. The detection optical unit comprises a first detection objective, which is disposed downstream of a tube lens system. The tube lens system consists of two tube lenses, of which a first is associated with the objective and the other one is associated with the first detection objective. In cooperation with the objective, the first tube lens generates a first intermediate image. Here, the optical axis of the first detection objective is perpendicular to the optical axis of the objective. Since the target region illuminated by the light sheet is arranged at an angle to the optical axis of the objective, the first intermediate image also lies at an angle to the optical axis of the first detection objective. In cooperation with the second tube lens, the first detection objective images the first intermediate image into a second intermediate image, which is likewise at an angle to the optical axis of the first detection objective.

The detection optical unit furthermore comprises a second detection objective, which images the second intermediate image byway of a further tube lens onto the detection surface of a light detector. Here, the optical axis of the second detection objective is both perpendicular to the second intermediate image and perpendicular to the detection surface. A straightened image of the scanned target region is generated on the detection surface as a result of the cooperation between the two detection objectives.

A disadvantage here is the comprehensive technical, and hence cost-intensive, outlay required for the imaging since a second light microscope structure is required for observing the intermediate image generated by a microscopic relay system.

Furthermore, the detection efficiency is low since the collection NA is limited due to the required obliqueness of various optical units, in particular of the second detection objective with a high NA, and the transmission of the overall system is low due to the multiplicity of required optical units. Also, the flexibility of the use of the system is greatly restricted since the objective properties are dependent on the overall structure and the objective is therefore not interchangeable in respect of different practical applications. Moreover, the observed sample plane is not orientable in an arbitrary manner in relation to the optical axis since the excitation geometry is predetermined by the arrangement of the detection objectives.

What is more, the described technical solutions require mechanical movements and are therefore susceptible to wear-and-tear and faults in both of the cited publications.

SUMMARY OF THE INVENTION

Proceeding therefrom, the object of the invention lies in developing a method for light sheet microscopy, which no longer has the illustrated disadvantages. Another object underlying the invention is that of specifying at least one arrangement suitable for carrying out the new method.

For a method of the type set forth at the outset, this object is achieved by the following method steps:

scanning a sample volume to be imaged with a light sheet, which includes an angle $\delta \neq 90°$ with the optical axis of an objective, wherein the light sheet passes through the entire sample volume to be imaged in the propagation direction, and wherein the depth of field $S_{obj}$ of the objective is less than the depth T of this sample volume in the direction of the optical axis, increasing the depth of field $S_{obj}$ in the detection beam path to a depth of field $S_{eff}$ which is greater than or equal to the depth T of this sample volume, positioning the sample volume within the depth of field $S_{eff}$, converting the optical image signals obtained with the increased depth of field $S_{eff}$ into electronic image signals with assignment to the regions of origin thereof in the sample volume and generating images of the scanned sample volume from the electronic image signals.

The sample volume to be imaged is either the entire volume of a sample to be examined or a spatial part to be examined of the overall volume of the sample.

Within the meaning of the invention, the nominal depth of field defined by the design of the respectively employed objective is defined to be the depth of field $S_{obj}$. Byway of example, the following applies for a high-aperture aplanatic objective:

$$\Delta z = 1.77 \lambda \Big/ \left[ 4 \sin^2 \frac{\alpha}{2} \left( 1 - \frac{1}{3} \tan^4 \frac{\alpha}{2} \right) \right].$$

where $\alpha$ is the aperture angle of the objective, n is the refractive index of an immersion liquid and NA is a numerical aperture in accordance with $\alpha = \arcsin(NA/n)$. A depth of field $S_{obj}$ of $\Delta z = S_{obj} = 0.83$ μm is obtained for a water immersion objective with an NA of 1.2. In the case of standard objectives, as can be used for the method according to the invention, the depth of field $S_{obj}$ lies in the range from 0.5 μm to 170 μm.

Depth of field $S_{eff}$ is understood to mean an effective depth of field obtained over the course of the detection beam path, which is greater than the depth of field $S_{obj}$. According to the invention $S_{eff} \geq T$ applies.

The direction of the optical axis of the objective corresponds to the z-coordinate direction of a Cartesian coordinate system. The spatial alignment of the light sheet is defined within the meaning of the invention by the propagation direction of the illumination light formed to be the light sheet. The light sheet is the region of the illumination beam path provided for illuminating the sample volume, in which region the illumination light does not exceed a spatial extent of e.g. 10 μm measured in the detection direction or in the direction of the optical axis of the objective and in which it is therefore suitable for detecting or measuring a sample volume according to the principle of light sheet microscopy.

The light sheet can be generated in different procedures; it can either be projected into the sample volume in the form of a widened collimated laser beam, which e.g. is focused in only one direction by means of a cylindrical lens, or be generated with a punctiform laser focus moving in a scanning fashion. It is also conceivable to generate the light sheet by means of light forming elements such as e.g. SLMs (spatial light modulators).

Depending on the sample volume to be scanned, it is possible to vary the position of the light sheet in relation to the objective in the x, y and z-direction, and/or the angle $\delta$, and/or the alignment of the light sheet within said sample volume by centric or eccentric rotation about the optical axis.

Advantageously, the sample volume is scanned using the reflected-light method. The axially non-discriminating detection, provided according to the invention, advantageously permits, in combination with the light sheet illumination with a known tilt, sample regions to be illuminated and imaged, which sample regions not only lie in the focal plane of the detection objective, but also lie, as seen in the axial direction, at different depths in the sample upstream or downstream of the focal plane.

In alternative embodiments of the method according to the invention, two- or three-dimensional images of the scanned sample volume are generated in a manner dependent on the selection of the optical means for imaging the detection light on the reception plane of the area sensor and the algorithm for the signal processing. Embodiments in which two- or three-dimensional images of the scanned sample volume are generated according to the extended depth of field procedure or light-field technology, for example with the inclusion of diffractive optical elements (DOE) into the detection beam path, are advantageous.

Illuminating the sample through the objective, in transmitted light or else laterally in accordance with the selective plane illumination microscopy (SPIM) method, lies within the scope of the method according to the invention.

Implementing the stimulated emission depletion (STED) principle in the method according to the invention is also conceivable. Here, the thickness of the light sheet contributing to the imaging is reduced by virtue of a double light sheet being superimposed onto the excitation light sheet in such a way that the zero position of the double light sheet substantially lies at the position of the excitation light sheet. The emission stimulated at the wavelength of the double light sheet is not taken into account when evaluating the signal, as a result of which the longitudinal resolution is increased. Furthermore, all methods known per se, in which the resolution is increased by linear or nonlinear means, are combinable by the method according to the invention. Methods from localization microscopy, such as photo activated localization microscopy PALM, stochastic optical reconstruction microscopy (STORM) or super-resolution optical fluctuation imaging (SOFI) for obtaining images in 2D and 3D, are particularly suitable in this respect. Moreover, multi-photon methods for generating the signal light can be used, such as e.g. 2- or 3-photon microscopy, SHG, THG microscopy or CARS excitation.

The object underlying the invention is furthermore achieved by an arrangement for carrying out the method according to the invention described above. This arrangement comprises:

means for scanning a sample volume to be imaged with a light sheet (9), which includes an angle δ≠90° with the optical axis of an objective, wherein
the light sheet passes through the entire sample volume to be imaged in the propagation direction, and wherein
the depth of field $S_{obj}$ of the objective is less than the depth T of this sample volume in the direction of the optical axis,
an optical device disposed downstream of the objective, embodied to increase the depth of field $S_{obj}$ to a depth of field $S_{eff}$ which is equal to or greater than the depth T of this sample volume,
means for positioning the sample volume within the region of the depth of field $S_{eff}$,
a spatially resolving optoelectronic area sensor disposed downstream of the optical device, and
hardware and software, embodied to generate images of the sample volume from the electronic image signals output by the area sensor.

Byway of example, the objective has a nominal depth of field $S_{obj}$ in the range from 0.5 µm to 170 µm, and the optical device disposed downstream of the objective is embodied to increase the depth of field $S_{obj}$ by a factor a ≥5 to the effective depth of field $S_{eff}$, where $S_{eff}$≥T always applies.

The arrangement according to the invention is preferably equipped with optical means
for generating a light sheet scanned into the sample volume, and
for varying the position of the light sheet in relation to the objective in the x, y and z-direction, and/or
for varying the angle δ, and/or
for varying the alignment of the light sheet within the sample volume by centric or eccentric rotation about the optical axis.

A common objective is preferably available for illumination and detection, and provision is made for shining the illumination light into the entrance pupil of the objective at a location offset parallel to the optical axis thereof. In this case, a device is present, which is embodied to
change the distance between the entrance location of the illumination light and the optical axis of the objective,
displace the entrance location in the pupil plane along a partial circle, the radius of which corresponds to the distance of the entrance location of the illumination light from the optical axis, and to
change the direction for shining the illumination light into the entrance pupil of the objective.

When operating this embodiment of the arrangement according to the invention, the angle δ or the inclined position of the light sheet is predetermined with the decentral shining of illumination light into the entrance pupil of the illumination and detection objective. The displacement of the entrance location of the illumination light along the circumference of the partial circle in the pupil plane brings about a rotation of the light sheet about the optical axis of the objective. Changing the direction of shining in illumination light or the angle of shining in illumination light relative to the normal of the pupil, which extends parallel to the optical axis within the meaning of the invention, leads to a displacement of the light sheet in the case of an elliptic Gaussian light sheet and influences the lateral extent of a light sheet which arises by scanning an elongate point spread function in the illumination.

By way of example, the optical device for increasing the depth of field $S_{obj}$ comprises an axicon, a phase mask or a microlens array. Here, the axicon or the phase mask are used in conjunction with the generation of two- or three-dimensional images according to the extended depth of field procedure, while the microlens array is used in conjunction with the generation of two- or three-dimensional images according to the light-field technology.

By way of example, cubic, logarithmic, exponential, fractional power phase masks and rational phase masks can be used within the meaning of the invention as phase masks, as can all further phase masks which can be used for lengthening the detection PSF. Furthermore, it is also possible to use pupil masks, which influence the amplitude of the light to be detected. Thus, pupil masks which have increased absorption in certain regions and therefore bring about apodization or lead to stopping down of the objective NA come into question. Here, it is also possible to advantageously use a mixture of absorbing and phase-influencing regions of a mask.

The reception area of the area sensor is rectangular, aligned at least substantially at right angles to the detection beam path and fixedly arranged in the detection beam path in this position, to be precise independently of a change in position or inclination, or rotation, of the light sheet. In contrast to the prior art, there is no need to update the area sensor or the reception area following a movement of the light sheet. As a result, mechanically moved components are dispensed with and the arrangement is less susceptible to errors. Byway of example, a CCD sensor can be provided as area sensor.

Furthermore, there is no need for a microscopic relay system for generating an intermediate image and consequently there is also no need for a second light microscope structure for observing such an intermediate image such that, compared to the prior art, the solution according to the invention requires substantially less technical outlay and it is less cost intensive as a result. Moreover, the detection efficiency is higher since the NA is not restricted by the oblique position of a plurality of optical units, in particular of high-aperture objectives. Due to the smaller number of required optical units, the transmission of the overall system is higher than in the comparable prior art.

A substantial advantage of the invention furthermore consists of spatial images of samples being obtained with objectives which have a comparatively small nominal depth of field $S_{obj}$. As a result of this, it is possible to use cost-effective standard objectives or standard imaging conditions. The standard objectives can be interchanged with one another in respect of various practical applications since the objective properties are independent of the overall structure. As a result, the arrangement according to the invention can be used in a substantially more flexible manner.

A PC and means for electronic storage and visually perceivable reproduction of two- or three-dimensional images serve as hardware. The software corresponds to a predetermined algorithm for signal evaluation and for generating the two- or three-dimensional images as a result of the signal evaluation.

In a complementary embodiment, the arrangement according to the invention optionally has a device for changing the location for shining illumination light into the entrance pupil of the illumination and detection objective such that the shining-in can be optionally undertaken decentrally or centrally in relation to the optical axis thereof. As a result, it is possible, when required, to switch from scanning the selected sample volume according to the light sheet microscopy method to scanning according to the conventional laser scanning method. Thus, when the illumination light is shone centrally into the entrance pupil of the objective, the optical image signals are obtained in accordance with confocal laser scanning microscopy.

DETAILED DESCRIPTION OF EMBODIMENTS

It is to be understood that the FIGS. and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
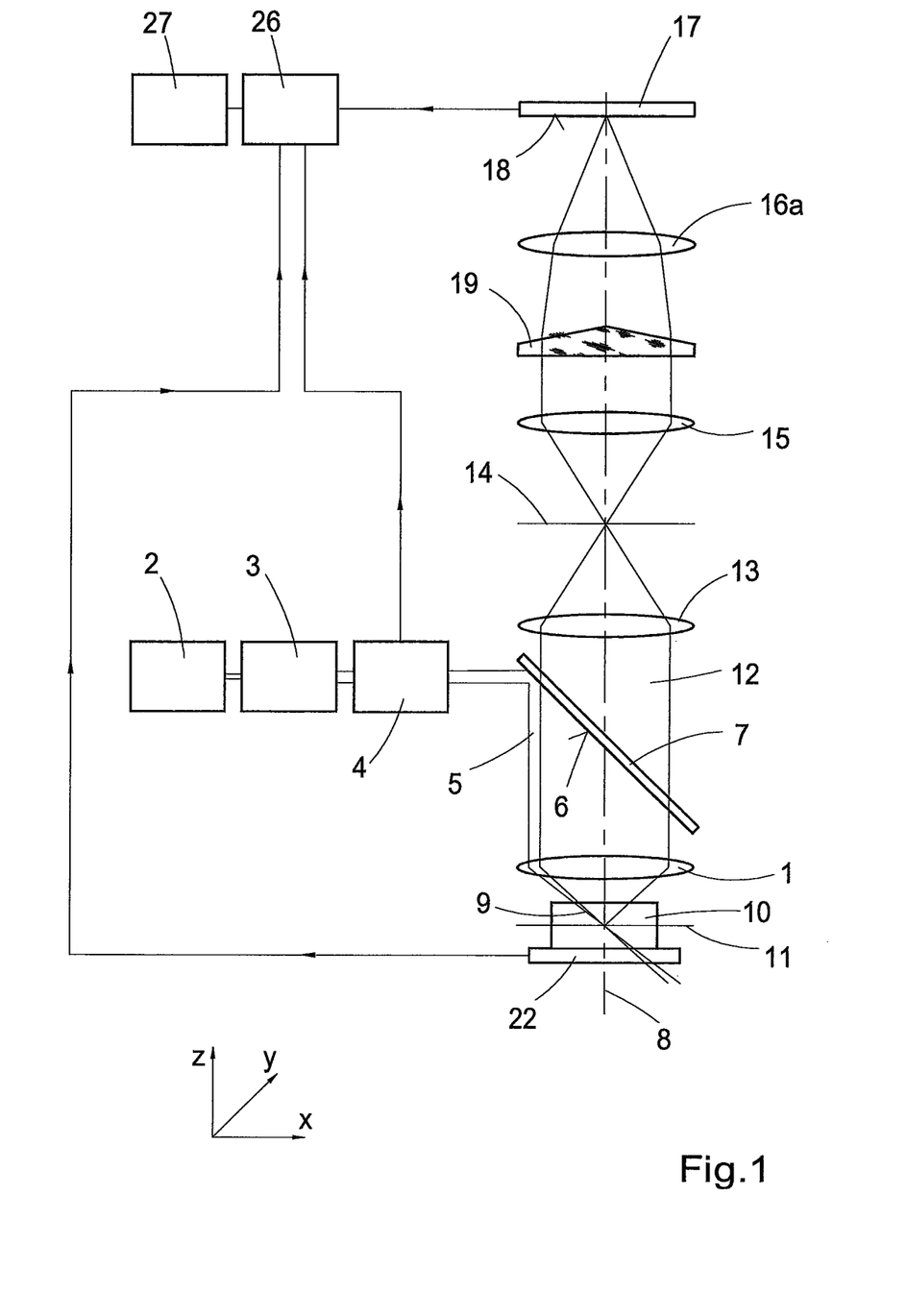
FIG. 1 shows a first exemplary embodiment of the arrangement according to the invention, in which the reception device has an area sensor, u-stream of which an axicon is arranged in the detection beam path.

The exemplary embodiment shown in FIG. 1 has an objective 1 with a fixed focal length, imaging toward infinity, said objective being provided for use both as an illumination objective and as a detection objective. Nominally, it can be designed for a depth of field $S_{obj}$ in the range from 0.5 μm to 170 μm.

Figure 4:
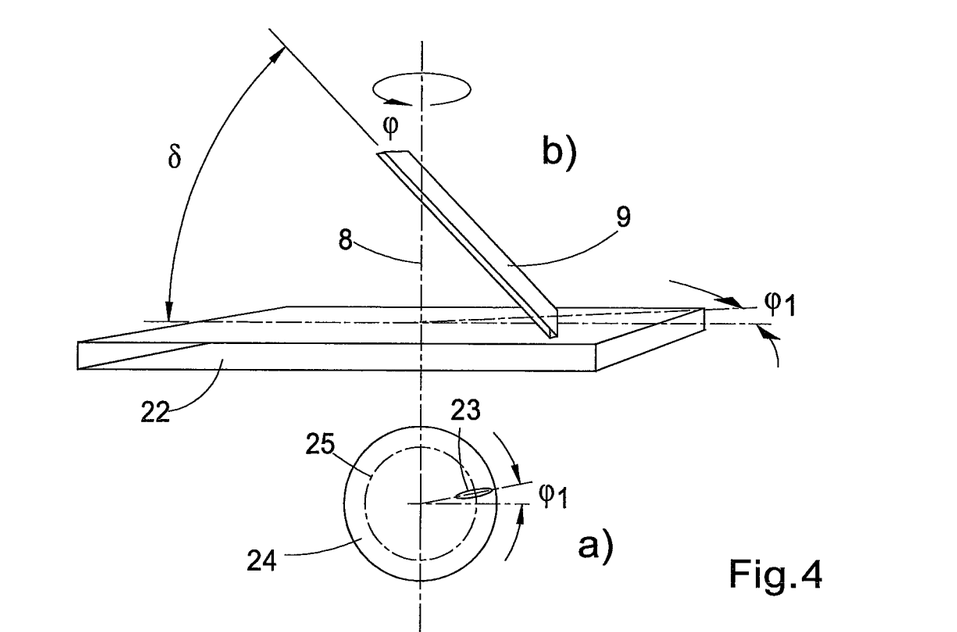
FIG. 4 shows the realization of a first exemplary position and alignment of a light sheet in a sample in relation to the optical axis of an objective.
Figure 5:
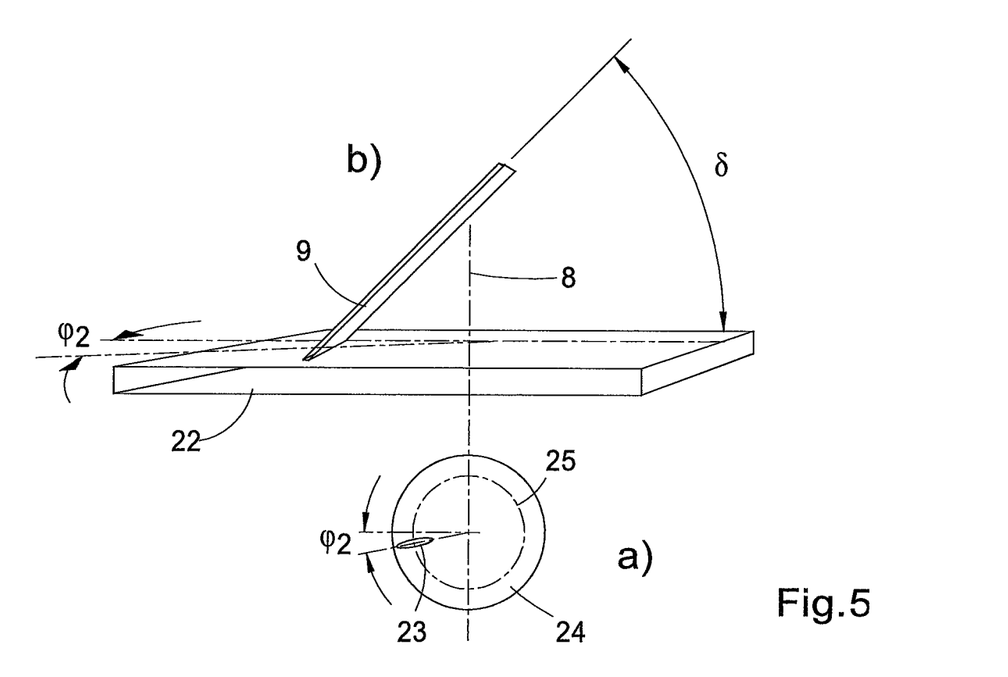
FIG. 5 shows the realization of a second exemplary position and alignment of a light sheet in a sample in relation to the optical axis of an objective.

A laser light source 2, a beam widening optical unit 3 and a scanning device 4 generate an illumination beam path 5, which is deflected toward the objective 1 by means of the splitter surface 6 of a beam splitter 7 and which is shone with lateral offset from the optical axis 8 of the objective 1 into the entrance pupil 24 of the objective 1 (cf. FIG. 4 and FIG. 5). The widened, collimated laser beam, which is e.g. only focused in one direction by means of a cylindrical lens (not depicted in the drawing) and thus formed into a light sheet 9, is projected into the sample volume 10 byway of the objective 1. In alternative embodiments, the light sheet 9 can be generated by means of a punctiform laser focus moved in a scanning manner or by means of any other light-shaping procedure.

The illumination light being shone in a decentral manner in relation to the optical axis 8 causes the propagation direction of the light sheet 9 to include an angle δ with the optical axis 8 which differs from 90°. Here, the size of the angle δ is dependent on the distance between the entrance location 23 of the illumination light into the entrance pupil 24 and the optical axis 8.

A consequence of the light sheet 9 being at an angle relative to the optical axis 8 is that the light sheet 9 also illuminates regions of the sample volume 10 which lie at different depths in front of, and behind, the focal plane 11 in the axial direction, i.e. in the z-direction.

With the scanning movement in the x- and/or y-direction, the scanning device 4 prescribes the current position and alignment of the light sheet 9 within the sample volume 10. Said scanning device 4 is also embodied to rotate the light sheet 9 about an angle about the optical axis 8 or about an axis parallel to the optical axis 8 (cf. FIG. 4 and FIG. 5). Moreover, the scanning unit 4 enables the displacement of the entrance location 23 of the illumination light in the pupil plane along the circumference of a partial circle 25, the radius of which corresponds to the distance of the entrance location 23 from the optical axis 8.

Here, the scanning device 4 is embodied in an exemplary manner to change the distance between the entrance location 23 of the illumination light and the optical axis 8, displace the entrance location 23 in the pupil plane along a partial circle 25, the radius of which corresponds to the distance of the entrance location 23 from the optical axis 8, and to change the direction for shining the illumination light into the entrance pupil 24 of the objective 1.

However, the scope of the invention explicitly also includes each one of these functions being exercised by separate devices embodied therefor.

Reflected, scattered or excited light coming from the illuminated sample regions enters the objective 1 as detection light. The objective 1 forms a detection beam path 12, to which the splitter surface 6 is transparent, as depicted in FIG. 1. A tube optical unit 13 matched to the objective 1 is used to generate an intermediate image 14, which is subsequently imaged on the reception plane 18 of an area sensor 17 by means of two further lens groups 15 and 16a and an axicon 19. The reception plane 18 is fixedly positioned in an image plane of the objective 1 which is conjugate to the focal plane 11.

In the detection beam path, the axicon 19 is positioned between the two lens groups 15, 16a. The axicon 19 transforms the detection light into a Bessel-shaped light beam with a very long focus and therefore, according to the invention, brings about an increase in the nominal depth of field $S_{obj}$ of the objective 1 by a multiple to a depth of field $S_{eff}$, as a result of which the whole sample volume 10 scanned by the light sheet 9 is imaged sharply on the reception plane 18.

A depth-resolved image of each illuminated thin section of the sample volume 10 is established by calculation from the intensity distribution in the detection beam path 12 registered by the area sensor 17 and said image is depicted in a manner that is visually perceptible by an observer. Such restoration methods are known per se. In the case of the so-called wavefront coding by means of phase masks, the data record is initially decoded numerically. This is carried out by a deconvolution with a known point spread function (PSF) determined by the mask, the objective and the microscope system. A projection of the sample volume along the optical axis is obtained after this first step. In a further step, the a priori information about the respectively current illumination geometry is included in the sample restoration in such a way that a unique spatial assignment of each detected event to the scanned sample volume is carried out.

As can be seen from FIG. 1, a computing unit 26 is provided in this respect, for example in the form of a PC with appropriate processing software. The computing unit 26 receives the image signals from the area sensor 17 byway of the signal path depicted in FIG. 1, information about the spatial situation and alignment of the light sheet 9 relative to the illuminated sample volume 10 from the scanning device 4 and information about the position of the sample volume 10 in the z-direction relative to the object 1 from the sample stage 22, and it links this information by means of the processing software with the image signals for the purposes of obtaining two- or three-dimensional images of the scanned sample volume 10. The visually perceptible representation and/or storage of the results is carried out by means of a memory and reproduction unit 27 connected to the computing unit 26.

In a specific embodiment, the distance of the tube optical unit 13 from the position of the intermediate image 14 is $f_{13}$=200 mm. Byway of example, the lens group 15 is at a distance of $f_{15}$=200 mm from the position of the intermediate image 14 and generates an infinite beam path. The axicon 19 is at a distance of 41 mm from the lens group 15. The cone angle of the axicon 19 is ≤2; for example, it is 0.5 in this case. The distance between the axicon 19 and the reception plane 18 varies depending on the embodiment of the arrangement according to the invention; it can be up to 50 cm and is determined by the length of the Bessel beam which is generated by the axicon 19. The reception plane 18 is positioned in the region of the Bessel beam.

The lens groups 15, 16a can both consist of a plurality of lenses and be embodied as individual lenses. In principle, there is no need for a lens group 16a; the scope of the invention also includes an embodiment of the arrangement according to the invention without a lens or lens group 16a. However, a lens group 16a can advantageously be used to set optical parameters such as resolution and lateral magnification.

Figure 2:
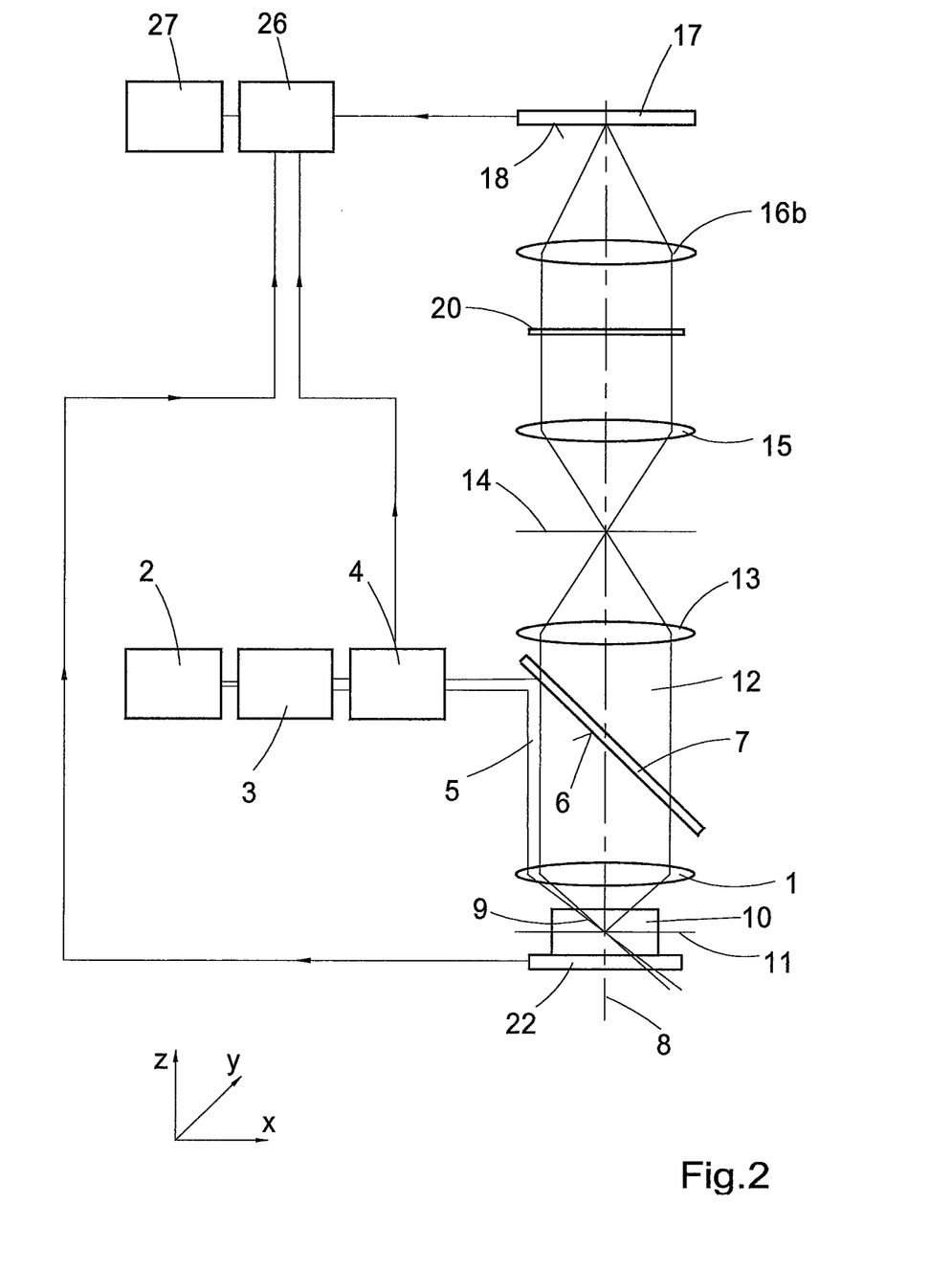
FIG. 2 shows a second exemplary embodiment of the arrangement according to the invention, but in this case with a cubic phase mask arranged upstream of the area sensor in the detection beam path.

FIG. 2 shows a second exemplary embodiment of the arrangement according to the invention. To the extent that the components illustrated here are comparable to components from FIG. 1 in respect of the functionality thereof, they are also provided with the same reference signs as in FIG. 1.

The difference to the exemplary embodiment according to FIG. 1 essentially consists of the fact that provision is not made here for an axicon 19 but for a cubic phase mask 20 between two lens groups 15 and 16b, which cubic phase mask is positioned in a pupil embodied between the lens groups 15, 16b.

The phase mask 20 transforms the detection light into an Airy-shaped light beam and likewise, according to the invention, brings about an increase in the nominal depth of field $S_{obj}$ of the objective 1 by a multiple to a depth of field $S_{eff}$, as a result of which the whole sample volume 10 scanned by the light sheet 9 is also imaged sharply on the reception plane 18 in this case.

By applying the extended depth of field (EDoF) technology, a depth-resolved image of each illuminated thin section of the sample volume 10 is established in turn by calculation using the computing unit 26 from the intensity distribution in the detection light beam registered by the area sensor 17 and said depth-resolved image is depicted in a manner visually perceivable by an observer by means of the memory and reproduction unit 27.

Figure 3:
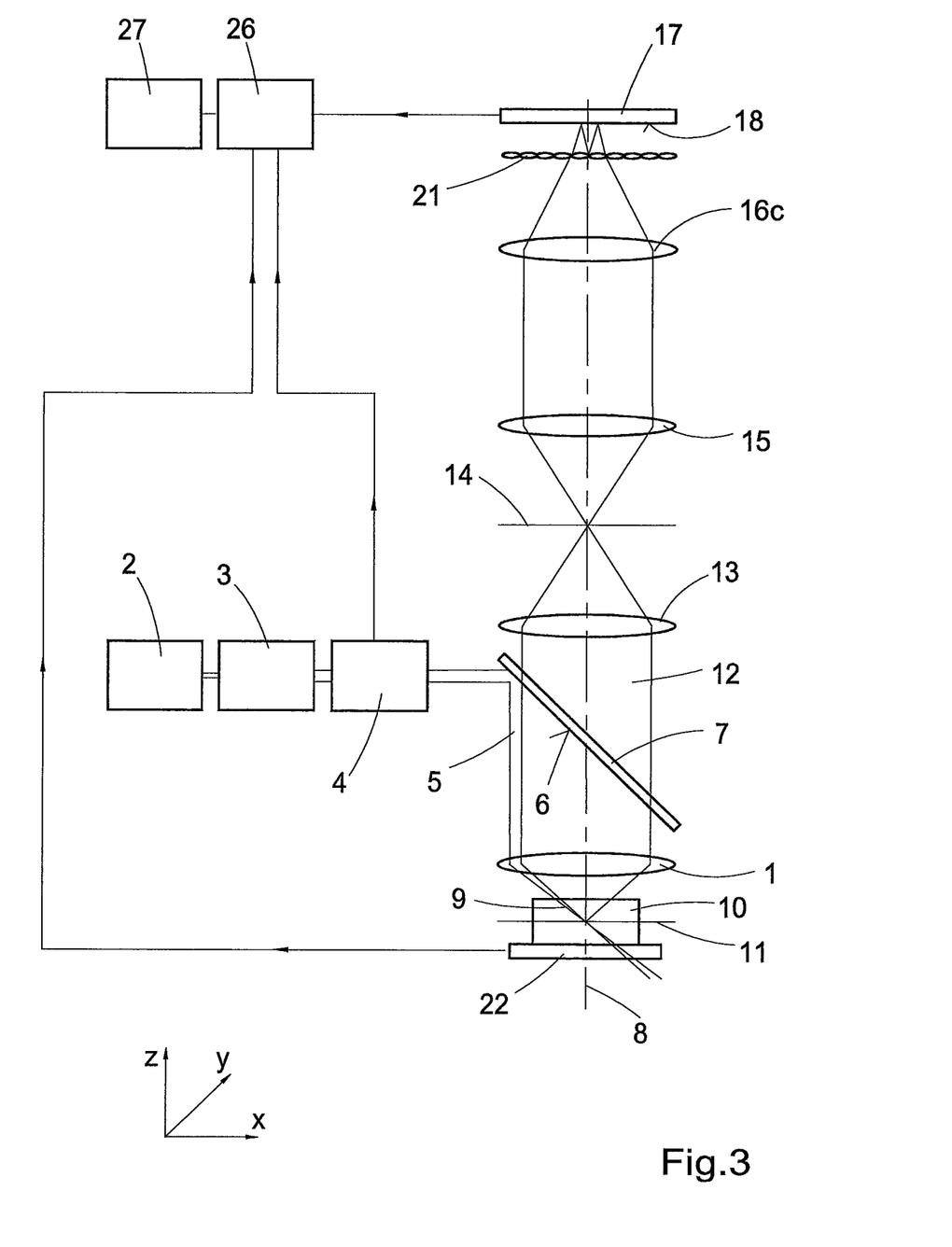
FIG. 3 shows a third exemplary embodiment of the arrangement according to the invention, in this case with a microlens array arranged upstream of the area sensor in the detection beam path.

FIG. 3 depicts a third exemplary embodiment. Here too, the same reference signs are also used for components, to the extent that these are comparable with components from FIG. 1 and FIG. 2.

The exemplary embodiment according to FIG. 3 differs from the preceding exemplary embodiments according to FIG. 1 and FIG. 2 in that provision is made neither for an axicon 19 nor for a phase mask 20, but for a microlens array 21 arranged upstream of the reception plane 18 instead.

The microlens array 21 increases the depth of field $S_{obj}$ of the objective 1 by a multiple to a depth of field $S_{eff}$ by virtue of the sample volume 10 scanned by the light sheet 9 being imaged as a whole on the reception plane 18. Below, a three-dimensional reconstruction of this volume is undertaken by virtue of a depth-resolved image of the illuminated thin section being established by calculation by means of the light-field technology from the registered intensity distribution of the detection light beam and said depth-resolved image being depicted in a visually perceivable manner.

In the case mentioned here, obtaining and using the a priori information about the respectively current illumination geometry, as described further above on the basis of FIG. 1, can be included to improve the results of the three-dimensional sample representation.

Here too, two- or three-dimensional images of the scanned sample volume 10 are obtained by means of a computing unit 26.

FIG. 4 and FIG. 5 depict two of the possible positions and alignments which the light sheet 9 can assume in relation to the optical axis 8 and to a sample stage 22 during the scanning of a sample volume 10 in an exemplary and perspective manner. For reasons of clarity, depicting an objective and a sample which is placed in a sample stage 22 and scanned by the light sheet 9 has been dispensed with in FIG. 4 and FIG. 5.

In a plan view of the entrance pupil 24 of an objective, FIG. 4a shows the entrance location 23 of the illumination beam path 5 into the entrance pupil 24, which is determined by the angle and the distance from the optical axis 8 and which causes the position and alignment of the light sheet 9 in the sample depicted in FIG. 4b.

By contrast, FIG. 5a shows in a plan view of the same entrance pupil 24 the entrance location 23 of the illumination beam path 5 into the entrance pupil 24, which is once again determined by the angle and the distance from the optical axis 8, but which brings about the position and alignment of the light sheet 9 in the sample depicted in FIG. 5b in this case.

In both cases, this pupil illumination shows, in an exemplary manner, the generation of an inclined elliptic Gaussian light sheet.

As can be seen from FIG. 4 and FIG. 5, it is possible to adapt the position and alignment of the light sheet 9 to a sample volume 10 to be scanned by varying the entrance location 23, here, as an example, by changing the angle φ, wherein, however, the angle δ between the optical axis 8 and the light sheet 9 is maintained. The intersection point of the light sheet 9 in respect of a sample plane away from the focal plane of the objective 1 in this case extends along a circular path.

A variation of the distance of the entrance location 23 from the optical axis 8 brings about a change in the angle δ between the light sheet 9 and the optical axis 8. An adaptation of the position of the light sheet 9 to the sample volume 10 which extends in the x- and y-direction is achieved by changing the entrance angle of the illumination light into the pupil plane of the objective 1. A displacement of the focal plane 11 or of the region of the depths of the field $S_{obj}$, $S_{eff}$ in the z-direction relative to the sample can be obtained by displacing the sample stage 22 in the z-direction.

Figure 6:
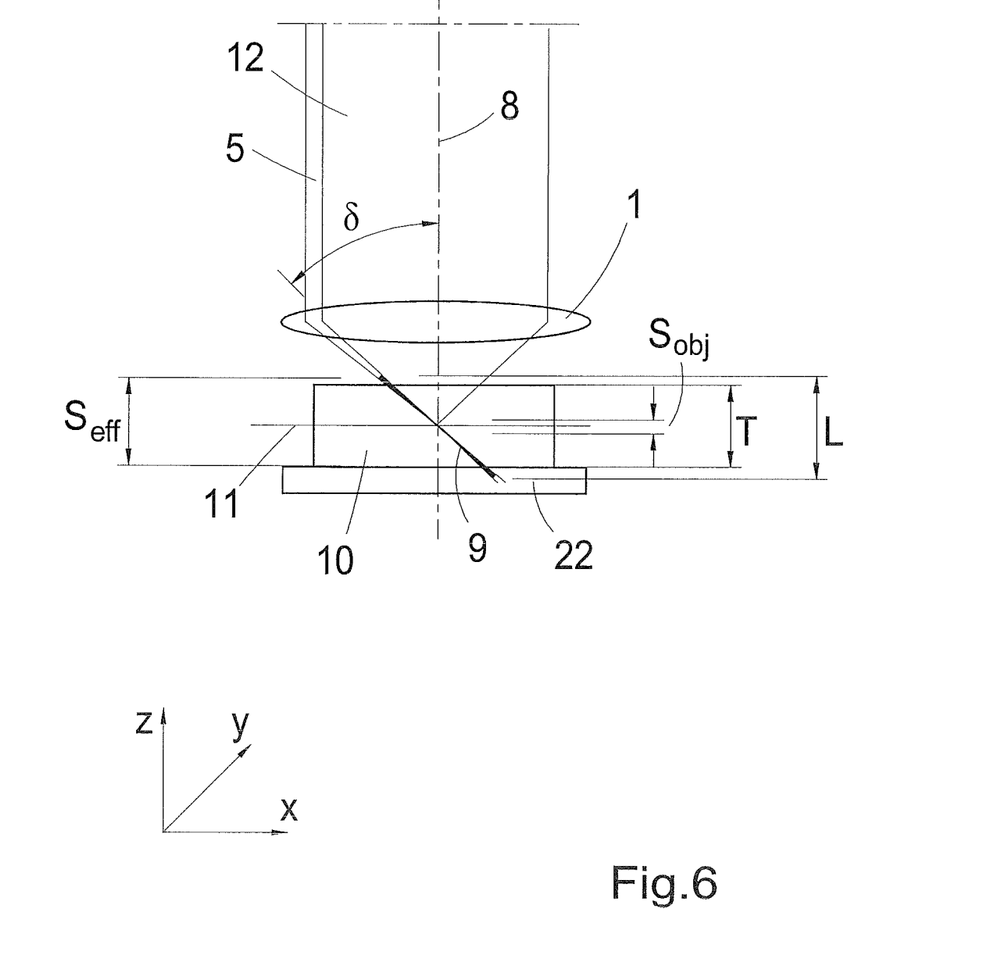
FIG. 6 shows a depth of field $S_{eff}$ obtained according to the invention in comparison with the nominal depth of field $S_{obj}$ of an objective and in comparison with the depth T of a sample volume, and the extent of the light sheet within the sample volume in comparison with the depth T of a sample volume.

In FIG. 6, the effective depth of field $S_{eff}$ obtained according to the invention is contrasted for comparison purposes with the nominal depth of field $S_{obj}$ of an objective 1 and the depth T of the illuminated volume 10 of a sample placed on the sample stage 22.

Moreover, it is possible to identify from FIG. 6 that the light sheet 9 extends over the whole depth T of the sample volume 10. In FIG. 6, the light sheet 9 extends in the z-direction over a range Δz=L, where L includes the depth T of the sample volume 10 such that the light sheet 9 illuminates the sample volume 10 over the entire depth T thereof.

This condition is also satisfied by the case L=T and therefore likewise lies within the scope of the invention.

Within the region L, the spatial extent of the light sheet 9 in the direction of the optical axis 8 does not exceed the value of e.g. 10 μm and it is therefore suitable for detecting or measuring a sample volume 10 according to the principle of light sheet microscopy.

In conjunction with the change in the angle and the displacement of the light sheet 9 or the sample in the x- or y-direction, the depth of field $S_{eff} \geq T$ enables the detection and imaging of the entire sample volume 10.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

LIST OF REFERENCE SIGNS

1 Objective
2 Laser light source
3 Beam widening optical unit
4 Scanning apparatus
5 Illumination beam path
6 Splitter surface
7 Beam splitter
8 Optical axis
9 Light sheet
10 Sample volume
11 Focal plane
12 Detection beam path
13 Tube optical unit
14 Intermediate image
15 Lens group
16 Lens group
17 Area sensor
18 Reception plane
19 Axicon
20 Phase mask
21 Microlens array
22 Sample stage
23 Entrance location
24 Entrance pupil
25 Partial circle
26 Computing unit
27 Memory and reproduction unit

The invention claimed is:

1. A method for light sheet microscopy, comprising the following steps:
scanning a sample volume with a light sheet which is formed by illumination light and has an angle δ≠90° with an optical axis of an objective, wherein:
the light sheet is directed to the entire sample volume to be imaged in a propagation direction; and
the objective directs both the illumination light to the sample volume and detection light from the sample volume; and
the illumination light is shined decentrally into an entrance pupil of the objective and in parallel with the optical axis of the objective;
a depth of field $S_{obj}$ of the objective is less than a depth T of the sample volume in a direction of the optical axis;
increasing the depth of field $S_{obj}$ in the detection beam path to a depth of field $S_{eff}$ that is greater than or equal to the depth T of the sample volume, and positioning the sample volume within the depth of field $S_{eff}$;
converting the optical image signals obtained with the increased depth of field $S_{eff}$ into electronic image signals with assignment to the regions of origin thereof in the sample volume; and
generating images of the scanned sample volume from the electronic image signals.

2. The method for light sheet microscopy as claimed in claim 1;
wherein, in a manner dependent on the sample volume to be scanned:
a position of the light sheet in relation to the objective is varied in the x, y or z-direction;
the angle δ is varied;
a spatial extent of the light sheet within the sample volume is varied by rotation about the optical axis; or
any combination of the above is performed.

3. The method for light sheet microscopy as claimed in claim 1;
wherein the sample volume is scanned using a reflected-light method.

4. The method for light sheet microscopy as claimed in claim 1;
wherein two-dimensional or three-dimensional images of the scanned sample volume are generated according to an extended depth of field technique or a light-field technique with an insertion of diffractive optical elements into the detection beam path.

5. The method for light sheet microscopy as claimed in claim 4;
wherein the two- or three-dimensional images of the scanned sample volume are generated according to the extended depth of field technique or light-field technique with the insertion of diffractive optical elements (DOE) into the detection beam path.

6. An arrangement for light sheet microscopy, comprising:
a scanning means configured to scan a sample volume to be imaged with a light sheet which is formed by illumination light and has an angle δ≠90° with an optical axis of an objective, wherein:

the objective directs both the illumination light to the sample volume and detection light from the sample volume, the illumination light being shined to an entrance pupil of the object at a location offset in parallel to the optical axis of the objective; and the light sheet is directed into a sample volume to be imaged in a propagation direction; and a depth of field $S_{obj}$ of the objective is less than a depth T of the sample volume in a direction of the optical axis;

a device configured to vary a direction for shining the illumination light into the entrance pupil; and an optical device, disposed downstream of the objective, configured to increase the depth of field $S_{obj}$ to a depth of field $S_{eff}$ that is equal to or greater than the depth T of the sample volume;

a positioning means configured to position the sample volume within a region of the depth of field $S_{eff}$;

a spatially resolving optoelectronic area sensor disposed downstream of the optical device; and hardware and software, which are configured to generate images of the sample volume from the electronic image signals output by the area sensor.

7. The arrangement for light sheet microscopy as claimed in claim 6, further comprising:

an optical means configured to:

generate a light sheet scanned into the sample volume; and vary at least one of:

a position of the light sheet in relation to the objective in the x, y, or z-direction;

the angle δ; and a spatial extent of the light sheet by rotation about the optical axis or about an axis parallel to the optical axis.

8. The arrangement for light sheet microscopy as claimed in claim 6;

wherein the optical device comprises:

a cubic phase mask; or a microlens array.

9. The arrangement for light sheet microscopy as claimed in claim 6;

wherein a CCD sensor with a reception area aligned at right angles, at least substantially at right angles, to the detection beam path is provided as an area sensor.

10. The arrangement for light sheet microscopy as claimed in claim 6, further comprising:

a means for changing the entrance location for shining illumination light into the entrance pupil of the objective, in a decentralized manner in relation to the optical axis thereof.

11. The arrangement for light sheet microscopy as claimed in claim 6;

wherein the hardware comprises:

a personal computer ("PC"); and a means for electronic storage and visually perceivable reproduction of two-dimensional or three-dimensional images; and wherein the software comprises a predetermined algorithm for signal evaluation and for generating the two-dimensional or three-dimensional images.

12. An arrangement for light sheet microscopy, comprising:

scanning means configured to scan a sample volume to be imaged with a light sheet which is formed by illumination light and has an angle δ≠90° with an optical axis of an objective, wherein the light sheet is directed into a sample volume to be imaged in a propagation direction; and wherein a depth of field $S_{obj}$ of the objective is less than a depth T of the sample volume in a direction of the optical axis;

an optical device configured as an axicon, disposed downstream of the objective, and configured to increase the depth of field $S_{obj}$ to a depth of field $S_{eff}$ that is equal to or greater than the depth T of the sample volume;

positioning means configured to position the sample volume within a region of the depth of field $S_{eff}$;

a spatially resolving optoelectronic area sensor disposed downstream of the axicon; and generating means configured to generate images of the sample volume from the electronic image signals output by the area sensor.

* * * * *

UNITED STATES PATENT AND TRADEMARK OFFICE
CERTIFICATE OF CORRECTION

PATENT NO. : 10,031,325 B2
APPLICATION NO. : 15/120162
DATED : July 24, 2018
INVENTOR(S) : Tiemo Anhut et al.

It is certified that error appears in the above-identified patent and that said Letters Patent is hereby corrected as shown below:

On the Title Page (56) Reference Cited under Foreign Patent Documents:
"DE 10 2005 02707" should read --DE 10 2005 027 077--

Signed and Sealed this
Fourth Day of December, 2018

Andrei Iancu
*Director of the United States Patent and Trademark Office*